Aug. 28, 1923.
N. C. JOHNSON
TOP BEARING CASTER SOCKET
Filed Aug. 5, 1921
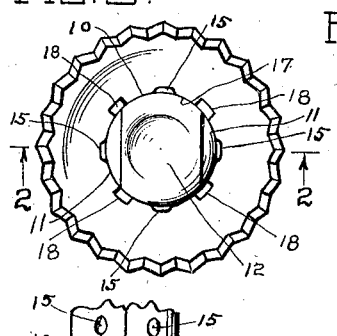
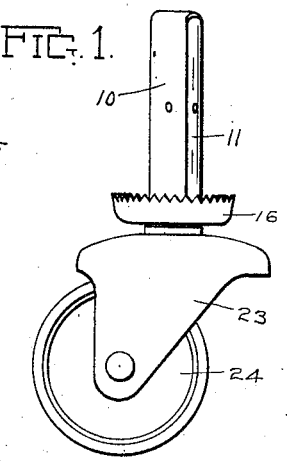
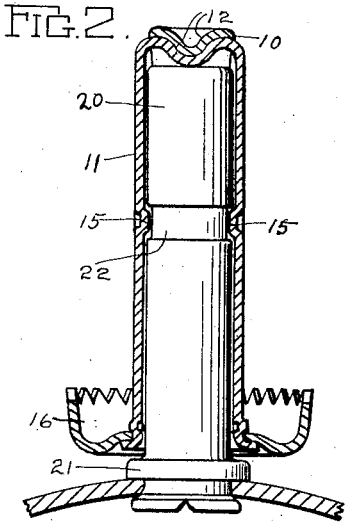
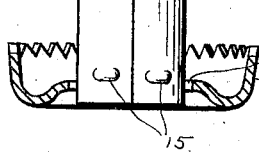
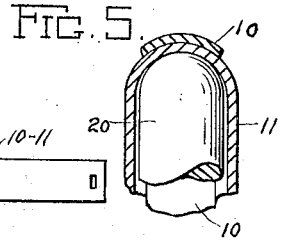
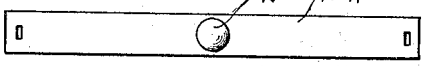
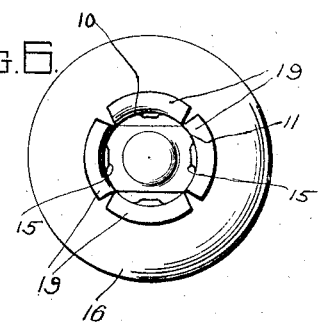
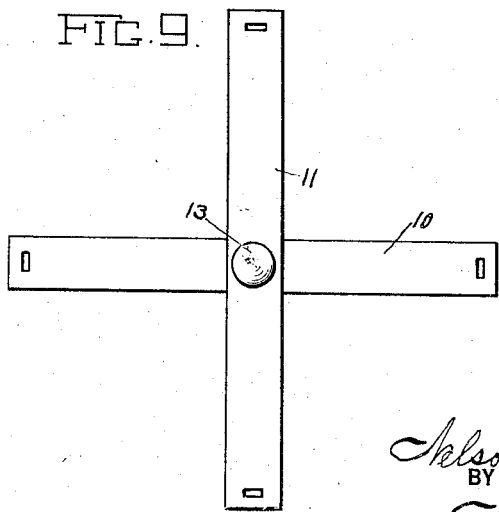
INVENTOR
Nelson C. Johnson
BY
ATTORNEY Patented Aug. 28, 1923.

1,466,531

UNITED STATES PATENT OFFICE.

NELSON C. JOHNSON, OF MERIDEN, CONNECTICUT, ASSIGNOR TO FOSTER, MERRIAM AND COMPANY, OF MERIDEN, CONNECTICUT, A CORPORATION OF CONNECTICUT.

TOP-BEARING CASTER SOCKET.

Application filed August 5, 1921. Serial No. 489,973.

*To all whom it may concern:*

Be it known that I, NELSON C. JOHNSON, a citizen of the United States, residing at Meriden, county of New Haven, State of Connecticut, have invented an Improvement in Top-Bearing Caster Sockets, of which the following is a specification.

This invention relates to a caster socket and has for an object to provide a caster socket in which the pintle is very free to turn. A further object of the invention is to provide a socket which is cheap to manufacture and comprises few parts so is strong and not liable to be easily broken or gotten out of order.

In the preferred embodiment the socket is made up of two narrow strips of sheet metal crossed at substantially their centers and formed into a tube in a forming die with the inner end pressed inwardly to form a center top bearing for the pintle of the caster inserted in the socket. The track plate is secured on the open end of the socket by spinning over the free ends of the plates forming the body, projections being provided on the plate to form a stop on the other side of the track plate.

For a more detailed description of the invention reference is had to the accompanying drawings in which;

Fig. 1 is a side elevation of a caster and socket removed from the article to which they are to be applied.

Fig. 2 is a central sectional elevation of the socket showing the pintle in place therein.

Fig. 3 is a top plan view of the socket.

Fig. 4 is a view showing the body of socket in elevation with the track plate in section but before the body portion has been spun over the same.

Fig. 5 is a section of the closed end of the socket showing a slightly modified form of bearing for the pintle.

Fig. 6 is a bottom plan view of the socket.

Fig. 7 is a plan view of one section of the socket ready to be inserted in the forming die.

Fig. 8 is a transverse central section of the member shown in Fig. 7, and

Fig. 9 shows two sections placed together in position to be inserted in the forming die.

The body of the socket is made up of two pieces of metal 10 and 11, which before being secured together to form the body are substantially identical and are clearly shown in Figs. 7 and 8. Each member is stamped from a strip of flat metal and at the same time is formed at the center thereof with a rounded recess 12 which will produce on the opposite side a projection 13. Adjacent each end each strip is formed with a projection 14 on the opposite side from the projection 13. In forming the body portion the two strips are placed crosswise at right angles, as shown in Fig. 9, over a forming die and are forced into the same by a plunger bearing upon the projection 13 on the top member bending the free sides together and curving them to form a tube, as shown in Figs. 1 to 4 and 6. The die is formed with short grooves adapted to receive the projections 14 so that the whole body member may be formed in one operation. While still in the die one of the body members, as 11, is formed with one or more inwardly extending projections 15 in the side wall thereof, by means of a transversely moving punch, the functions of which will presently be disclosed.

Track plate 16 is punched from sheet metal and is substantially cup shape, as shown. An opening 17 is formed in the center thereof to receive the open end of the body of the socket and a series of notches 18 are provided around the periphery of this opening to allow the lugs 14 to pass through the same when the track plate is applied to the body, as this track plate is more easily applied from the closed end. After the track plate is moved past the lugs 14, it is turned a partial revolution on the body and then the free ends of the body are spun over to form flanges 19, and secure the track plate firmly in position against the lugs 14.

It will be apparent from Fig. 2 that the projection 13 in the center of the inner member 11, projects within the socket from the closed end thereof and that projection 13 on the outer member 10 rests in the recess formed at the back of the projection in the inner member 11. This projection on the member 11 forms a point bearing for the end of the pintle 20, and as the flange 21 on the outer end of the pintle is spaced from the end of the socket, it will be clear the entire weight is carried on this bearing and that the pintle will be free to turn in the socket because of the small resistance of this type of bearing. Intermediate its ends the pintle 20 is provided with a groove 22 to receive the projections 15 to retain the pintle within the socket. As the side portions of the member 11 are somewhat resilient, the pintle may be inserted in and removed from the socket without trouble as the walls of member 11 will yield sufficiently to allow the projections 15 to slide by the inner end of the body member.

The usual caster horn 23 carrying the wheel 24 is mounted on the lower end of the pintle in the usual manner.

In the modification shown in Fig. 5, the end bearing for the pintle instead of being formed by projection 13 at the closed end of the socket, as shown in Fig. 2, is formed by having this closed end dished and the inner end of the pintle is rounded to fit the same. This form, however, is not as free as the preferred form as the bearing surface is greater.

It will be apparent from the foregoing description and the drawing that the socket is very simple in construction and will be comparatively cheap and easy to manufacture. Also because of the double thickness of the metal at the closed end of the socket forming the bearing for the pintle, that it will not quickly wear out. If this bearing should, however, become badly worn the caster will not be inoperative because the lower flange 21 on the pintle will have a bearing on the open end of the socket. The pintle is very free to turn in this socket as there is no binding action of any kind.

Having thus set forth the nature of my invention, what I claim is:

1. A caster socket comprising a plurality of strips of metal crossed at substantially the mid lengths thereof, the free ends bent at substantially right angles to form a tubular body, and the walls of the strips at the point of crossing being embossed to form complementary projections and recesses in nested relation.

2. A caster socket comprising a track plate having an opening therein, a tubular body member having an inwardly extending end wall and an open outer end inserted in said opening and flanged to secure the track plate thereon, said body member comprising a pair of metal strips crossed at substantially the centers thereof with the free ends bent at right angles to form the tubular portion and the walls of the strips at the point of crossing being pressed inwardly and in nested relation to form an end bearing for a caster pintle.

3. A caster socket comprising a plurality of strips of metal crossed at substantially the centers thereof, the free ends bent at substantially right angles to form a tubular body, and the walls of the strips at the point of crossing being pressed inwardly to form a top or end bearing for a pintle, the projection on the outer strip being seated in the recess at the back of the projection on the inner strip.

4. A caster socket comprising metal strips embossed at substantially their centers to form complementary projections and recesses, said strips being crossed with the projections in nested relation and the free ends bent at substantially right angles to form a tubular body, a track plate having an opening therein adapted to receive the open end of said body, stop means on the body to position the track plate thereon, and the end of the strips being turned over the track plate to secure it in position.

5. A caster socket comprising metal strips embossed at substantially their centers to form complementary projections and recesses, said strips being crossed with the projections in nested relation and the free ends bent at right angles in the direction of the projections to form a tubular body, one of said strips being provided with a projection adapted to coact with a shoulder on a pintle to retain the same in the socket.

In testimony whereof I affix my signature.

NELSON C. JOHNSON.